(12) United States Patent
Cackley et al.

(10) Patent No.: US 12,241,550 B2
(45) Date of Patent: Mar. 4, 2025

(54) SEAL WITH SIDING CHANNEL

(71) Applicant: Jaeger-Unitek Sealing Solutions, Inc., LaPorte, IN (US)

(72) Inventors: Jason Cackley, South Bend, IN (US); Leon Bogucki, Rolling Prairie, IN (US); Makoto Sato, Michigan City, IN (US); Raymond Young, Wanatah, IN (US); Colton Phelan, LaPorte, IN (US); Owen Strieter, LaPorte, IN (US)

(73) Assignee: Jaeger-Unitek Sealing Solutions, Inc., LaPorte, IN (US)

( * ) Notice: Subject to any disclaimer, the term of this patent is extended or adjusted under 35 U.S.C. 154(b) by 81 days.

(21) Appl. No.: 18/104,503

(22) Filed: Feb. 1, 2023

(65) Prior Publication Data

US 2023/0250876 A1     Aug. 10, 2023

Related U.S. Application Data

(60) Provisional application No. 63/307,750, filed on Feb. 8, 2022.

(51) Int. Cl.
*B60R 13/06*     (2006.01)
*F16J 15/04*     (2006.01)

(52) U.S. Cl.
CPC ............... *F16J 15/04* (2013.01); *B60R 13/06* (2013.01)

(58) Field of Classification Search
CPC .................................. F16J 15/04; B60R 13/06
See application file for complete search history.

(56) References Cited

U.S. PATENT DOCUMENTS

| | | | | |
|---|---|---|---|---|
| 3,385,001 | A | * | 5/1968 | Bordner ................. E06B 7/2314 264/173.17 |
| 4,042,741 | A | | 8/1977 | Bright |
| 4,538,380 | A | * | 9/1985 | Colliander ............ E06B 7/2314 49/490.1 |
| 5,151,307 | A | * | 9/1992 | Jackson .................... B60J 10/75 156/244.11 |
| 5,237,782 | A | | 8/1993 | Cooper |
| 6,715,818 | B2 | | 4/2004 | Raisch |
| 6,966,590 | B1 | | 11/2005 | Ksiezopolki et al. |

(Continued)

FOREIGN PATENT DOCUMENTS

| | | | |
|---|---|---|---|
| JP | 2009126226 A | * | 6/2009 |
| WO | 1997017221 A1 | | 5/1997 |

OTHER PUBLICATIONS

Trim-Lok web page regarding Snap-In-Seal for RV and Camper Slide-Outs, retrieved Mar. 3, 2023 from https://www.trimlok.com/plastic-extrusion/rv-slide-out-seal; 1 page.

(Continued)

*Primary Examiner* — Eugene G Byrd
(74) *Attorney, Agent, or Firm* — Vedder Price P.C.

(57) ABSTRACT

A seal useful in sealing slide out rooms may be used singularly or in pairs to straddle a wall through which the opening is located. The seal includes a passageway for containing cabling. The passageway is cooperatively formed by a base, an offsetting member, a movable bulb, and a deformable rib. In use, the movable bulb may be lifted to access the passageway. When closed, the movable lid presses against and deforms the rib to create a substantially watertight seal around the passageway.

23 Claims, 11 Drawing Sheets

(56) References Cited

U.S. PATENT DOCUMENTS

| | | |
|---|---|---|
| 9,045,027 B2 | 6/2015 | Young et al. |
| 9,625,037 B2* | 4/2017 | Young ........................ B60P 3/34 |
| 10,208,860 B2* | 2/2019 | Young .................... F16J 15/027 |
| 11,287,044 B1* | 3/2022 | Maloney .................... B60P 3/34 |
| 11,560,948 B2* | 1/2023 | Mathias ................. F16J 15/027 |
| 2006/0091687 A1 | 5/2006 | Schoffner et al. |
| 2014/0212621 A1* | 7/2014 | Blottiau .............. B29C 45/0003 |
| | | 264/254 |
| 2016/0280153 A1* | 9/2016 | Filipczak ................. B60J 10/86 |
| 2018/0080558 A1* | 3/2018 | Maloney ................ F16J 15/027 |

OTHER PUBLICATIONS

Steele Rubber Products web page regarding Lock-N-Seal; retrieved Mar. 3, 2023 from https://www.steelerubber.com/lock-n-seal-70-3865-265; 1 page.

Steel Rubber Products web page regarding 15/16" Bulb Seal with Domed Channel; retrieved Mar. 3, 2023 from https://www.steelerubber.com/bulb-seal-with-channel-70-3882-265; 1 page.

* cited by examiner

SEAL WITH SIDING CHANNEL

CROSS-REFERENCE TO OTHER APPLICATIONS

This application claims the benefit of a priority to U.S. Provisional Application No. 63/307,750 filed Feb. 8, 2022, the contents of which are incorporated by reference.

BACKGROUND OF THE INVENTION

Seals for slide out rooms in recreational vehicles, or other applications that require the sealing of openings that are exposed to outdoor elements, are often cumbersome in their use and installation. This is due to several factors. First, the openings for slide out rooms are not standard in that the wall thickness is not always uniform. This often forces the use of many seals to cover various wall thicknesses. It is also possible that the walls are not perfectly even in their thickness. Further, the construction of recreational vehicles or other outer facing walls includes an inner substrate such as foam, wood or other insulating member that is covered on its exterior surface by a type of exterior covering or siding that is often fiberglass, plastic or metal.

At the opening where a slide out room in a recreational vehicle is located, the edge of the opening must be finished and sealed to create an aesthetically pleasing and functional design. One way of accomplishing this is to place trim around the opening and then fit a seal to the opening. This can be time-consuming and requires multiple different materials and products that need to be cut, attached and then maintained. This creates inefficiencies in production and can increase cost.

Cabling (such as electrical wiring) often must be run along the exterior surface. It is desirable (if not necessary) to protect such cabling from the elements generally and water specifically. One approach is to fully seal and weatherproof the cabling itself. However, this approach increases the cost of materials, requires the use of specialized cabling or additional sealing materials, and may prove insufficient to protect the cabling over time.

There exists a need in the marketplace, therefore, to provide a solution that both provides a visually appealing and functional way of finishing and sealing an opening of an exterior wall such as the opening in which a slide out room is located on a recreational vehicle while also providing improved protection to cabling disposed therein.

SUMMARY OF THE INVENTION

A seal useful in sealing slide out rooms is adapted to restrain cabling therein. The seal comprises a base, an offsetting member, and a bulb portion that cooperatively form a passageway adapted to contain cabling. The bulb has an outer arcuate portion that is integrally joined to opposing sidewall portions. The sidewall portions extend into an inner wall that defines an enclosed space within the bulb portion. The bulb portion may also have a protrusion that can touch the base. A rib extends from the base opposite the offsetting member. In an embodiment, the bulb portion is hingedly connected to the base while the rib is resilient. The bulb contacts the rib and the base in a lowered position to seal the passageway and may be lifted to enable easy access to the passageway (such as to install, repair, or remove cabling contained therein).

In an embodiment, a wiper extends from the base substantially, co-linearly to the base and opposite the offsetting member. The wiper has a proximal end and a distal end, with the proximal end being integrally joined to the base. A locating leg extends perpendicular to the base and has a distal end and a proximal end that is integrally joined to the base.

In an embodiment, the locating leg extends above the wiper and contacts the bulb when the bulb is in the lower position, further sealing access to the passageway.

In one advantage of the present disclosure a seal is provided that can be installed on an opening of a wall and contain cabling therein within a protected passageway. The passageway can be accessed by lifting a bulb. In this manner, an element-proof seal is created along the opening that provides an integral, weather-proof passage to contain cabling while forming an aesthetically pleasing joint between the wall and the slide out room or other adjacent member. This hides the cabling from view and prevents the need for additional, separate seals or weatherproofing to be used on the cabling.

DETAILED DESCRIPTION OF INVENTION

First Embodiment

Figure 1:
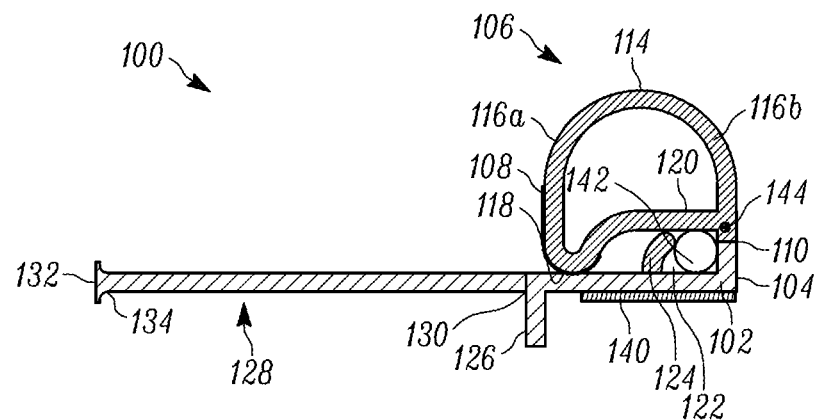
FIG. 1 is a cross-sectional view of a seal in accordance with a first embodiment of present disclosure.

FIGS. 1-5 show a first embodiment of a seal 100 of in accordance with the present disclosure. This seal 100 is particularly useful in the sealing of slide out rooms used in recreational vehicles. The seal 100 includes a base 102, an offsetting member 104, a bulb 106, and wiper 128. The offsetting member 104 extends perpendicularly "upwards" from the base 102 toward a bulb 106.

In the embodiment shown, the bulb 106 is integrally joined to the offsetting member 104 at bulb hinge 110. Sidewall 116b and inner wall 120 meet proximate the hinge 110. The bulb 106 has an outer arcuate portion 114 that is joined to opposing sidewalls 116a, 116b. Sidewall 116a extends towards the base 102, with protrusion 118 extending below inner wall 120 and contacting the base when the bulb 106 is in a lowered position (as shown in FIG. 1). The inner wall 120 is parallel to the base 102.

In the embodiment shown, a slip coat 108 extends around a portion of the sidewall 116a and protrusion 118. As will be clear to one of skill in the art, in alternative embodiments, the slip coat 108 may be omitted.

A rib 124 extends from base 102 towards bulb 106. A passageway 122 is formed bounded by base 102, first offsetting member 104, second offsetting member 144, inner wall 120, and rib 124. The passageway 122 is sized and adapted to securely contain cabling 142 therewithin, as discussed in greater detail below.

In the embodiment shown, rib 124 is formed of a resilient material and is sized such that with the bulb 106 in its lower position, rib 124 is pressed against inner wall 120 and resiliently deformed, thereby creating a seal therebetween and impeding access to the passageway 122.

A wiper 128 extends co-linearly from the base 102 and is integrally joined to the base 102 at a proximal end 130. A distal end 132 is cantilevered with respect to the proximal end 130. The wiper 128 has lateral sides 138a, 138b that are substantially parallel and the distal end 132 includes a flared tip 134. It is also contemplated that the lateral sides may in some cases not be parallel, such as if non-uniform cross sections are desired. For instance, a taper narrowing from the proximal end 130 toward the distal end 132 may be used.

A locating leg 126 is joined to the base 102 and extends perpendicularly "downwards" away from the base 102 and the bulb 106. In the embodiment shown, the locating leg 126 is joined with to the base 102 at the same location as the proximal end 130 of the wiper 128 joins the base 102. The entire locating leg 126 is farther from the offsetting member 104 than the outermost portion of the sidewall 116a nearest the wiper 128. Therefore, the entire bulb 106 is between the outermost portion of the offsetting member 104 and the surface of the locating leg 126 facing the offsetting member 104.

In the embodiment shown, the base 102 is of a relatively high durometer material (i.e., Material A, shown in FIGS. 1 and 2 using widely spaced hash marks) compared to the rest of the seal 100, and while resilient to some degree it is substantially less flexible than other parts of the seal 102 as discussed below. The base 102 is made, in one embodiment, of a material of approximately 40 shore D. In an embodiment, the locating leg 126 is made from the same durometer material as the base 102. Further embodiments consider other relatively high durometer materials (including but not limited to 90 shore A).

In the embodiment shown, the bulb 106 is made of a material that is a lower durometer than the base 102. The bulb 106 is made, in one embodiment, of a material that is approximately 35 shore A. The use of the same wall thickness in the protrusion 118, sidewalls 116, and inner wall 120 allows the entire bulb 106 to be readily deformable when pressed against the base 102. In an alternative embodiment, the inner wall 120 and/or protrusion 118 are made from a higher durometer material such that when the bulb 106 is deformed, and the passageway 122 remains intact and uncompressed.

In the embodiment shown, the wiper 128 is made of a lower durometer material than that of the base 102. The material of the wiper 128, in one embodiment, is approximately 40 shore A hardness. In an embodiment, wiper 128 and bulb 106 may be made of the same material (i.e., Material B, as shown by the narrow hashes). As such, even though the wiper 128 and base 102 have roughly the same thickness, the wiper 128 is substantially more flexible than the base 102.

The seal 100, in one embodiment, is coextruded so the transitions between materials are integrally joined. The locations of the lower and higher durometer materials are placed to provide predictable bending of the seal 100. Offsetting member 104 provides a distance allowing for the bulb 106 to have a first (lower) position, shown in FIG. 1. In the embodiment shown, with the bulb 106 in the lower position, the inner wall 120 is spaced apart from the base 102 by a distance equal to the length of offsetting member 104. As will be clear to one of skill in the art, in the alternative embodiments discussed herein, such spacing may vary across the length of inner wall 120 (thereby creating a passageway 122 of varying height).

In the embodiment shown, the protrusion 118 touches the base 102 while in the first position. This contact point further impedes access of water and other environmental items into the passageway 122. In alternative embodiments, the length of the offsetting member 104 is greater than that of the protrusion 118 such that the protrusion 118 does not touch the base 102 in the first position. In embodiments, the protrusion 118 is offset from the base 102 by 1-6 mm while in the first position.

With the bulb 106 in its first (lower) position, the bulb 106 substantially encloses and covers the base 102 generally and the passageway 122 specifically. The resiliency of the offsetting member 104 and/or the hinge 110 bias the cantilevered bulb 106 into the lower position shown in FIG. 1.

Figure 2:
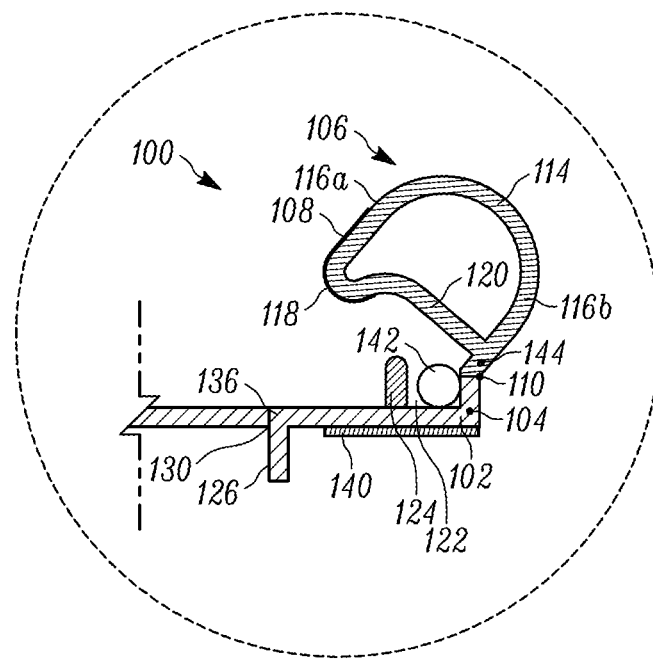
FIG. 2 is a second cross-sectional view of the seal of FIG. 1 wherein the bulb is in a second, raised position according to an embodiment of the present disclosure.

As shown in FIG. 2, offsetting member 104 and/or hinge 110 provides predictable bending that allows the bulb portion 106 to be bent into a second (raised) position. Having hinge 110 be of a softer durometer yields provides a bendable hinge while the first offsetting member 104 does not move. With the bulb 106 in its raised position, the rib 124 reverts to its uncompressed, upright position and the passageway 122 can be accessed (such as to install, repair, or remove cabling disposed therein).

The single connection of the bulb 106 to the base 102 through offsetting member 104 provides a sufficient gap between the inner wall 120 and base 102 to accommodate fasteners that may be driven through the base 102 into a wall to secure seal 100 around an opening such as an opening of a recreational vehicle where a slide out room is located.

Further, such space provides sufficient room for passageway 122 to contain one or more cables (not shown) securely therein.

Figure 3:
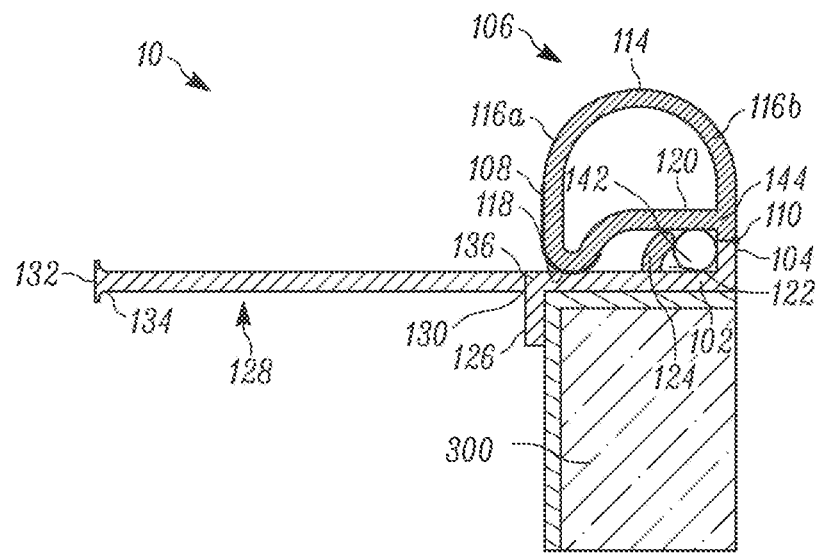
FIG. 3 is a cross-sectional view of a seal of FIG. 1 as installed on a wall.
Figure 4:
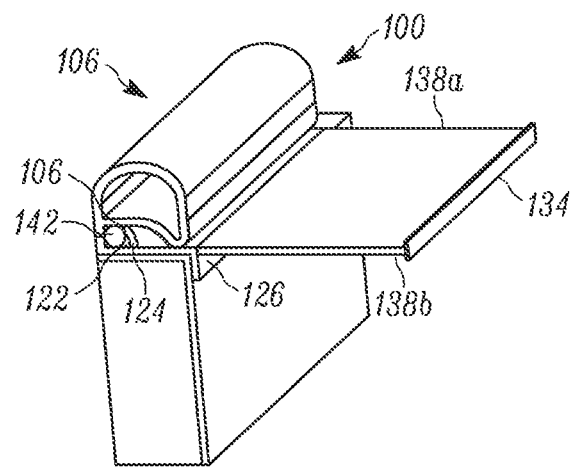
FIG. 4 is a perspective view of the seal installed on a wall of FIG. 3.
Figure 5:
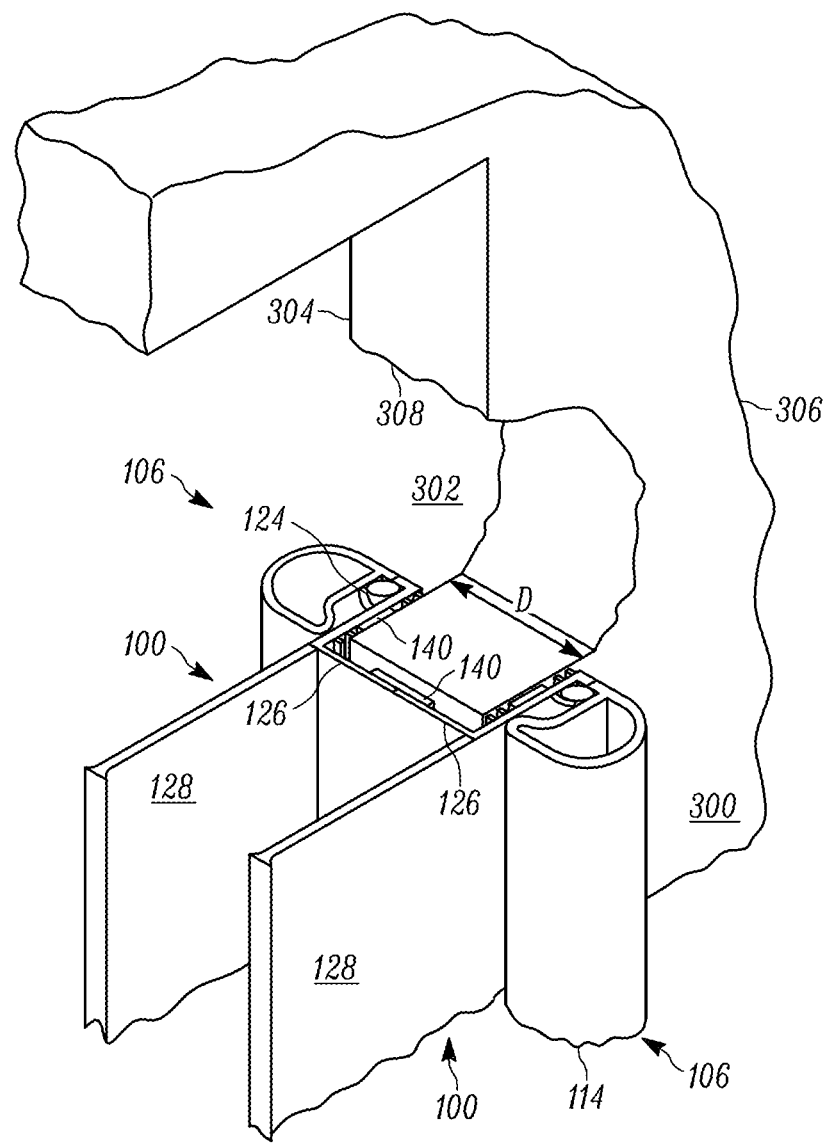
FIG. 5 is a view of two of the seals shown in FIG. 1 in their installed position in an opening in a recreational vehicle wall.

Exemplary installations of seals 100 in their intended use is shown in FIGS. 3-5. FIG. 3 depicts a cross section of a single seal 100 installed on wall 300, while FIG. 4 depicts a perspective view of the installation shown in FIG. 3. FIG. 5 depicts two seals 100 installed on a single wall 300, as may be done in an embodiment.

As shown, wall 300 is a typical recreational vehicle sidewall that receives a slide out room that is not shown. The wall 300 has a thickness D1 that can vary between different manufacturers or different models of recreational vehicles. The wipers 128 extend inwardly into the opening 302 and rub against a sidewall of the slide out room to form a seal. The opening 302 includes a transverse surface 308 that extends between an inner surface 304 and an outer surface 306.

Because of the high friction that may be encountered on the wipers 128, an anti-friction coating (not shown) may be applied to the surface near the flared tips 134. In an embodiment, the coating is between 0.002 and 0.010 inches and has a durometer of 40-90 shore D (Material D). The coating is a thermoplastic that has flexibility in spite of its hardness due to its low thickness. This will allow the corners of the flared tips 134 to conform to the sidewall of the slide out room and be resistant to abrasion.

In addition to providing a low friction surface, the coating provides a surface that will not adhere to the surfaces it contacts. The same coating may be used, in embodiments, for slip coat 108. This is an important property for the arcuate portions 114 of the bulbs 106 because the flanges of the slide out room will be compressed against the arcuate portions 114 when the slide out room is extended or retracted. During times of extreme heat, this could cause lower durometer materials to stick to a flange on the slide out room, and the coating prevents adhesion of the bulbs 106 to the flanges.

Installation of the seal 100 is done by using adhesive tape 140 to secure the seal 100 in place. A first seal 100 is installed into the opening 302 with its leg 126 in the first position. The double sided adhesive tape strips 140 hold the seal 100 in place as shown in FIGS. 3-5.

Figure 10:
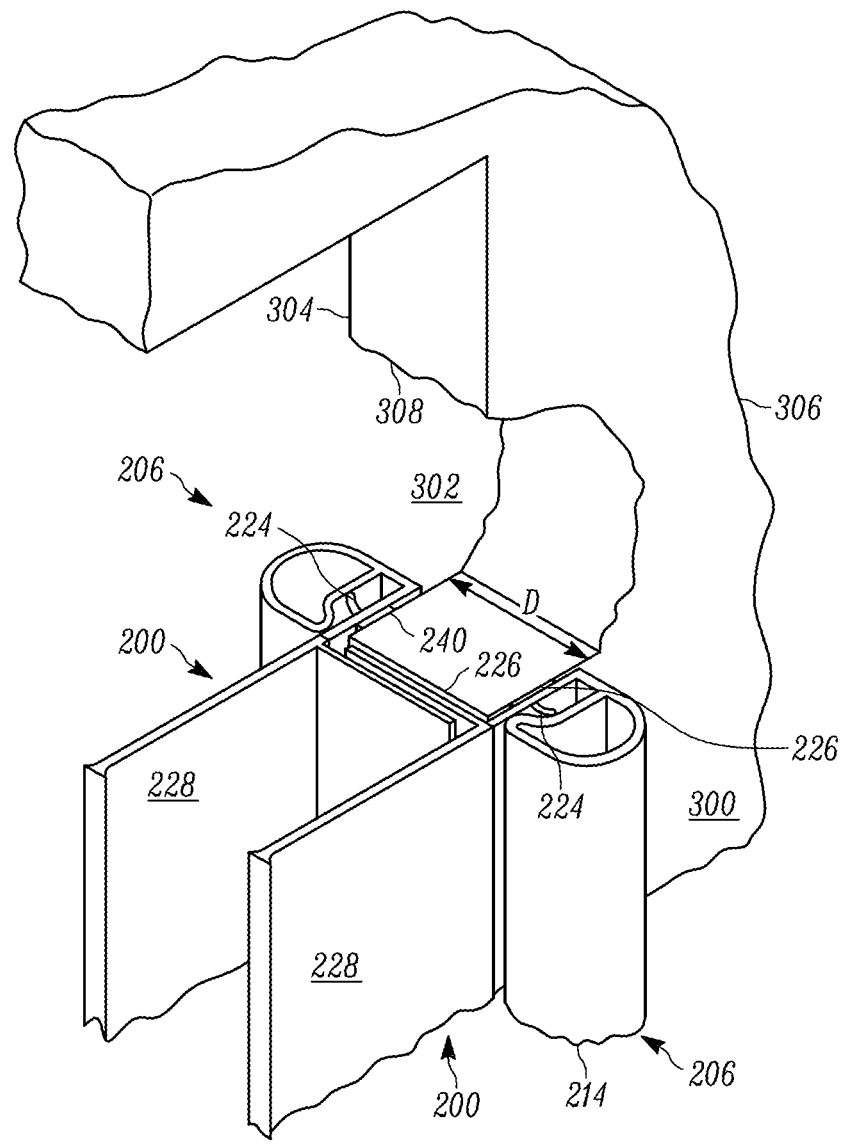
FIG. 10 depicts an alternative method for installing two of the seals shown in FIG. 1, wherein the locating legs of the seals overlap.

Additionally, screws may be driven through the base 102 into wall 300 for additional security in retaining the seal 100 in its desired location. This is done by bending the bulb portion 106 to its second position and then letting the bulb 106 snap back into its first position. This will conceal screws driven into the base 102. A second seal 100 is placed oppositely of the first seal 100 so that its leg 126 is proximate (or overlaps) the leg 126 of the first seal 100 and its base 102 is pressed against the wall 300. As FIG. 5 shows, in an embodiment multiple seals 100 together form a system of sealing that provides two wipers 128, which then form a watertight connection to the wall 300 on both sides as well as a watertight connection between the adjacent legs 126 with passageways 122 on either side of the wall 300 for running cabling in a secure, watertight compartment. While the legs 126 are shown in FIG. 5 as being in contact, as will be clear to one of skill in the art, the legs 126 may be spaced apart (e.g., for thicker walls) or overlap (e.g., for thicker walls or when longer legs 126 are used, as shown in FIG. 10).

This flexibility in use allows the seals 100 to conform to many different wall thicknesses D1. Each seal 100 has the same cross section, thus, it is possible to have a single roll of the seal 100, cut it to the desired length, and use a piece of the same roll for both sides of the wall 300. The likelihood of a watertight seal for the slide out room is increased with the present system due to the simplicity of installation and the elimination of confusion that arises from using different fixed width seals for different wall thicknesses.

Also, the coating near distal ends 132 of the wipers 128 reduce friction against the slide out room being sealed. As such, using the seals 100 allows for using smaller motors to extend and retract the room. The coating on the bulb portions 106 of the seals 100 prevents the flanges from sticking and causing actuating motors to strain, to break the flange from prior art seals. Thus, wear is saved on both electrical components and mechanical components because sudden current surges will not be drawn by overworked motors.

Advantageously, the addition of rib 124 prevents water or other contaminants from accessing the passageway 122. For example, water flowing along a wiper 128 may traverse the space between protrusion 118 and base 102, as the space is substantially liner. However, water is unable to continue flowing past the rib 124, due to the varying geometry and compression between the rib 124 and the inner wall 120. These benefits are compounded in embodiments in which extension 136 is omitted.

Further, rib 124 restrains cabling in the passageway 122 when the bulb 106 is lifted. Beneficially, cabling may be placed in the passageway 122 prior to fully securing the seal 100 to a wall 300 (such as prior to driving screws or other fasteners through the base) and securely held in place by the rib 122. This enables the seal 100 to be moved to ensure the cabling is routed correctly.

Second Embodiment

FIGS. 6-10 depict a second embodiment of a seal 200 of in accordance with the present disclosure. Except as otherwise noted herein, like reference numbers (e.g. the bulb of the first embodiment 106 and this embodiment 206) are used to identify like components. This seal 200 is generally similar to seal 100, except as otherwise noted.

As shown, the seal 200 includes a base 202, a first offsetting member 204, a bulb 206, and wiper 228. The offsetting member 204 extends perpendicularly "upwards" from the base 102 toward a bulb 206.

Figure 6:
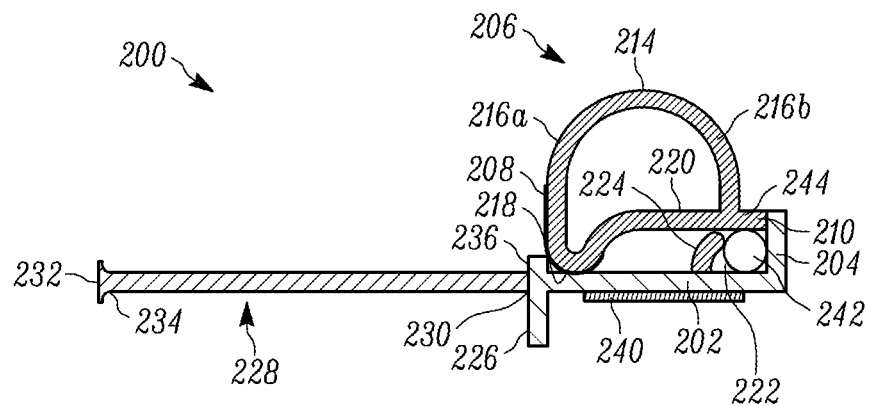
FIG. 6 is a cross-sectional view of a seal in accordance with a second embodiment of present disclosure.

In the embodiment shown, the bulb 206 comprises a second offsetting member 244 that extends toward the first offsetting member 204 and is integrally joined with it at bulb hinge 210. Sidewall 216b and inner wall 220 meet proximate the second offsetting member 244. The bulb 204 has an outer arcuate portion 214 that is joined to opposing sidewalls 216a, 216b. Sidewall 216a extends towards the base 202, with protrusion 218 extending below inner wall 220 and contacting the base when the bulb 202 is in a lowered position (as shown in FIG. 6). The inner wall 220 is parallel to the base 202. In the embodiment depicted in FIG. 6, when the bulb 206 is in its lowered position, the second offsetting member 244 is generally perpendicular with the first offsetting member 204.

The protrusion 218 further comprises a slip coat 208. As will be clear to one of skill in the art, in alternative embodiments, the slip coat 208 may be omitted.

Figure 7:
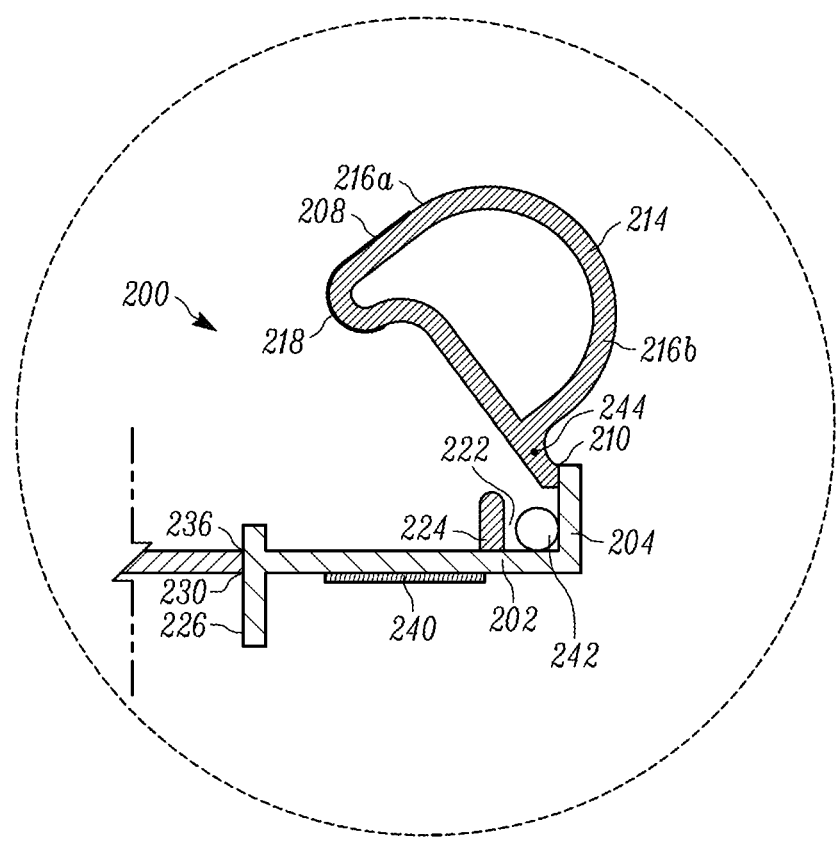
FIG. 7 is a cross-sectional view of the seal of FIG. 6 wherein the bulb is in a second, raised position according to an embodiment of the present disclosure.

As shown in FIG. 7, offsetting member 204 and/or hinge 210 provide predictable bending that allows the bulb portion 206 to be bent into a second (raised) position. Having hinge 210 be of a softer durometer yields a bendable hinge 210 while the first offsetting member does not move. With the bulb 206 in its raised position, the rib 224 reverts to its uncompressed, upright position and the passageway 222 can be accessed.

A rib 224 extends from base 202 towards bulb 206. A passageway is formed bounded by base 202, first offsetting member 204, second offsetting member 244, inner wall 220, and rib 224. The passageway 222 is sized and adapted to securely contain cabling 242 therewithin.

A wiper 228 extends co-linearly from the base 202 and is integrally joined to the base 202 at a proximal end 230. A distal end 232 is cantilevered with respect to the proximal end 230. The wiper 228 has lateral sides 238a, 238b that are substantially parallel and the distal end 232 includes a flared tip 234.

A locating leg 226 is joined to the base 202 and extends perpendicularly "downwards" away from the base 202 and the bulb 206. In the embodiment shown, the locating leg 226 is joined with to the base 202 at the same location as the proximal end 230 of the wiper 228 joins the base 202. The entire locating leg 226 is farther from the offsetting members 204, 244 than the outermost portion of the sidewall 216a nearest the wiper 228. Therefore, the entire bulb 206 is between the outermost portion of the offsetting members 204, 244 and the surface of the locating leg 226 facing the offsetting members 204, 244.

As shown, an extension 236 extends upwards from the locating leg 226 and contacts the sidewall 216a and/or protrusion 218 when the bulb 202 is in its lower position. Advantageously, this additional extension 236 may further serve to prevent water or other contaminants from accessing the interior of the passageway 222.

Figure 8:
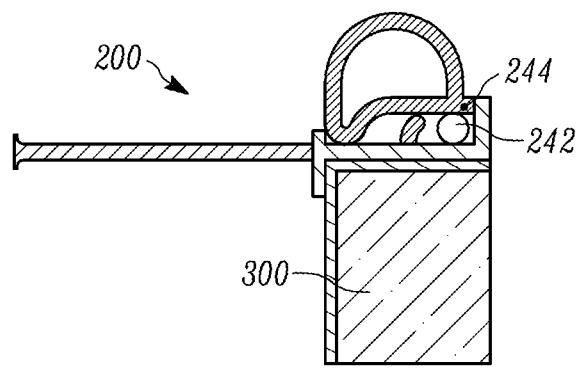
FIG. 8 is a cross-sectional view of a seal of FIG. 6 as installed on a wall.
Figure 9:
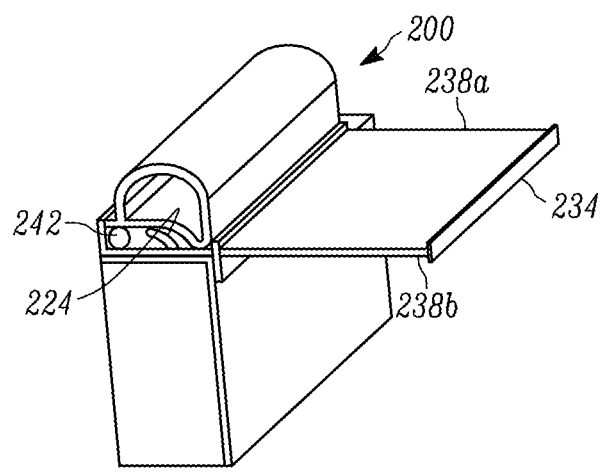
FIG. 9 is a perspective view of the seal installed on a wall of FIG. 8.

Installation of the seal 200 in its intended use is shown in FIGS. 8 and 9. FIG. 8 depicts a cross section of a single seal 200 installed on wall 300, while FIG. 9 depicts a perspective view of the installation shown in FIG. 8.

Installation of the seal 200 is accomplished by use of adhesive tape 240 to secure the seal 200 in place. A first seal 200 is installed into the opening 302 with its leg 226 in the first position. The adhesive tape 240 holds the seal 200 in place as shown in FIG. 10.

Additionally, screws may be driven through the base 202 into wall 300 for additional security in retaining the seal 200 in its desired location. This is done by bending the bulb portion 206 to its second position and then letting the bulb 206 snap back into its first position. This will conceal screws driven into the base 202. A second seal 200 is placed oppositely of the first seal 200 so that its leg 226 overlaps the leg 226 of the first seal 200 and its base 202 is pressed against the wall 300. As FIG. 10 shows, in an embodiment multiple seals 200 together form a system of sealing that provides two wipers 228, which with the legs 226 form a watertight connection to the wall 300 with passageways 122 on either side of the wall 300 for running cabling in a secure, watertight compartment.

Further Embodiments

Except as otherwise noted herein, like reference numbers (e.g. the bulb, elements 106 and 206) are used to identify like components. The seals of the embodiments of FIGS. 12-18 are similar to the first and second embodiments unless otherwise noted.

Figure 11:
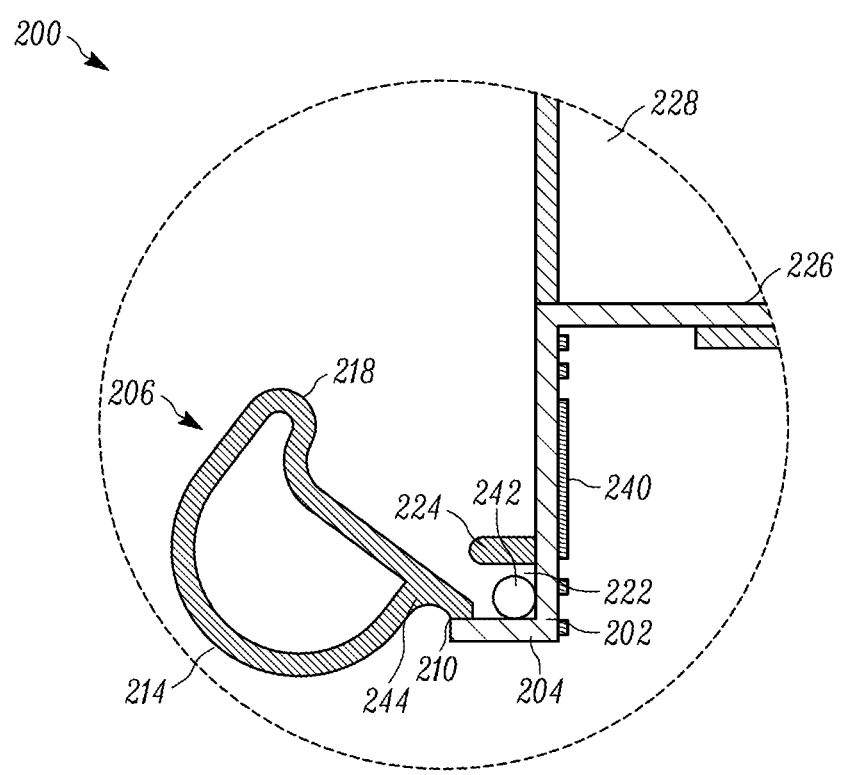
FIG. 11 depicts an alternative embodiment of the seal of FIGS. 6-10, wherein the seal is in an alternative position and does not include the additional extension or the slip coat.

FIG. 11 depicts an alternative embodiment of the seal 200, wherein the bulb 206 is in the raised position. This seal 200 is generally similar to the embodiment of the seal 200 depicted in FIGS. 6-10, except as otherwise noted. Here the base 202 is aligned in a vertical direction and offsetting member 204 extends perpendicularly "horizontal" from the base 202 and toward the bulb 206. The first offsetting member 204 and/or hinge 210 provide predictable bending that allows the bulb portion 206 to be bent into a second (raised) position. Having hinge 210 be of a softer durometer yields a bendable hinge 210 while the first offsetting member does not move. With the bulb 206 in its raised position, the rib 224 reverts to its uncompressed, upright position and the passageway 222 can be accessed.

Similar to the embodiment of FIG. 6, when the bulb 206 of FIG. 11 is in its lowered (or closed) position, the second offsetting member 244 is generally perpendicular with the first offsetting member 204. In addition, this embodiment comprises the same or similar arcuate portion 214, leg 226, wipers 228, and adhesive 240 as depicted in the embodiment of FIGS. 6-10.

Further, this embodiment comprises neither the slip coat 208 nor additional extension 236 disclosed in the description of the second embodiment 200.

Figure 12:
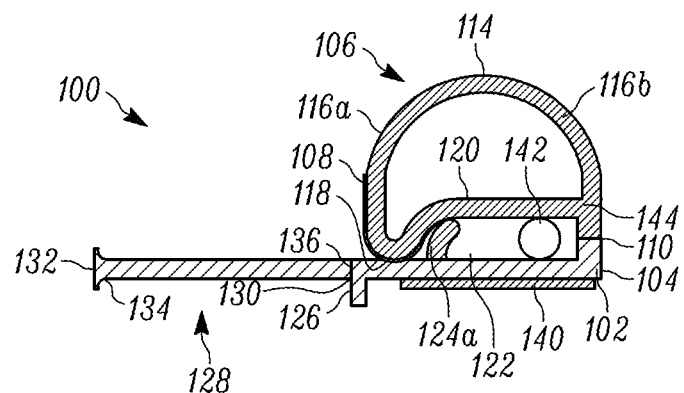
FIG. 12 depicts an alternative embodiment of the seal of FIG. 1, wherein the rib is located proximate the protrusion.

FIG. 12 depicts an embodiment of the seal 100 in which the rib 124a is located proximate the protrusion 118. As shown, the rib 124 contacts both protrusion 118 and inner wall 120 when the bulb 106 is in its lowered position. This advantageously increases the amount of surface area of the rib 124a in contact with the bulb 106, thereby improving the effectiveness of the seal.

Figure 13:
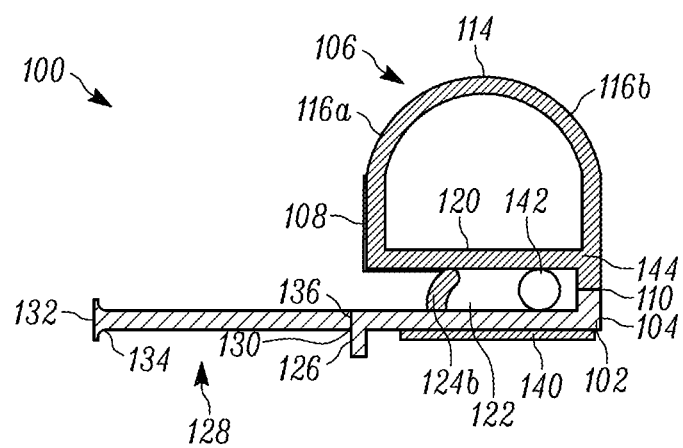
FIG. 13 depicts an alternative embodiment of the seal of FIG. 1, wherein the protrusion is omitted.

FIG. 13 depicts an embodiment of the seal 100 in which the protrusion 118 is omitted such that sidewall 116a directly joins to inner wall 120. As shown, inner wall 120 is parallel to the base 102 such that the seal is provided entirely by contact between the rib 124b and the inner wall 120. In alternative embodiments, the inner wall 120 may be angled to create the passageway 122 (such that point at which side wall 116a joins inner wall 120 is closer to the base 102 than the point at which side wall 116b joins inner wall 120), inner wall 120 may be curved or otherwise shaped so as to not be parallel to base 102, and/or an extension 136 may contact inner wall 120 when the bulb is in its lowered position so as to create the passageway 124b.

In an alternative embodiment, the second offsetting member 144 may be substantially parallel to first offsetting member 104, such that the second offsetting member 144 extends away from the base 102. In another alternative embodiment, the second offsetting member 144 may be omitted entirely, such that sidewall 116b and/or inner wall 120 is joined to hinge 110 directly.

Figure 14:
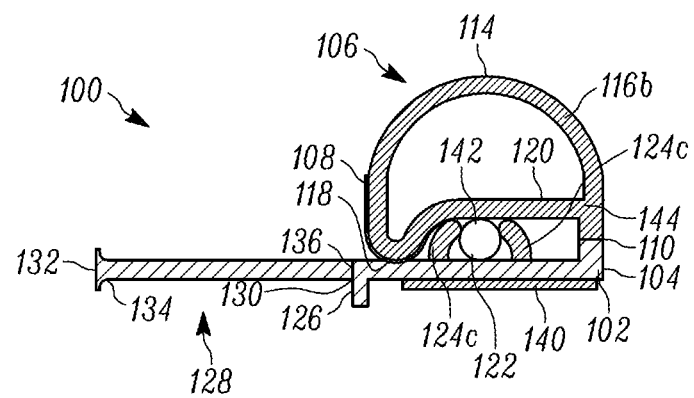
FIG. 14 depicts an alternative embodiment of the seal of FIG. 1, incorporating a pair of ribs.

FIG. 14 depicts an alternative embodiment having two ribs 124c. In such embodiment, the wire may be placed between the two ribs 124c, such that it is retained in place and sealed on both sides (i.e., front and back).

Figure 15:
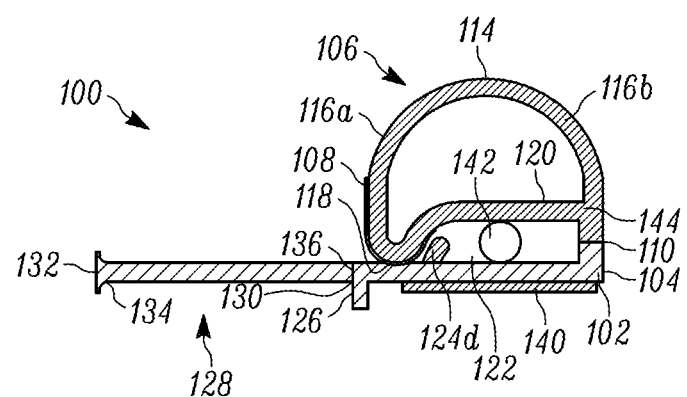
FIG. 15 depicts an alternative embodiment of the seal of FIG. 1, wherein the rib is of reduced height.

FIG. 15 depicts an alternative embodiment in which the rib 124d is located proximate the protrusion 118 and is of reduced height, such that the rib 124d contacts the protrusion 118 and not the base wall 120 when the bulb 106 is in the first position.

Figure 16:
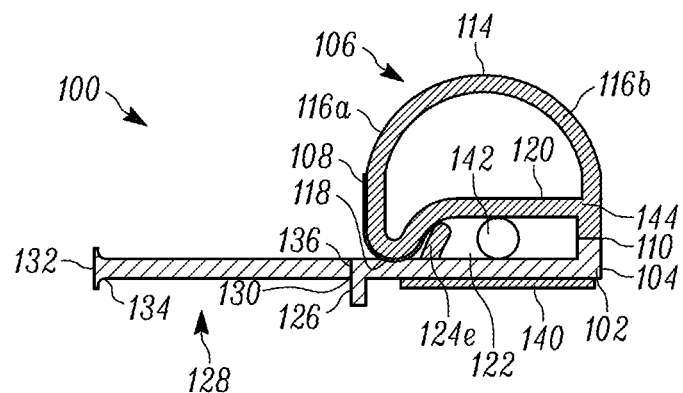
FIG. 16 depicts an alternative embodiment of the seal of FIG. 1, wherein the rib is formed of a rigid material.

FIG. 16 depicts an alternative embodiment in which the rib 124e is located proximate the protrusion 118, is angled towards the offsetting member 104, and is made from a material that is not resilient. As shown, the rib 124e is substantially rigid and is angled such that the rib contacts the protrusion 118 when the bulb 106 is in the first position. The rib 124e remains in this position as the bulb 106 is lifted.

Figure 17:
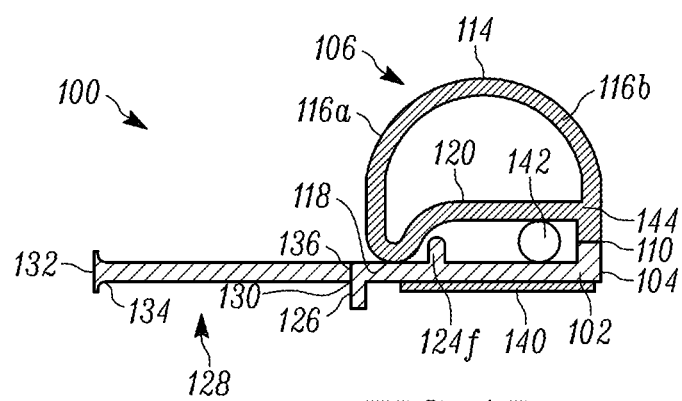
FIG. 17 depicts an alternative embodiment of the seal of FIG. 1, wherein the rib is formed from the same material as the base.

FIG. 17 depicts an alternative embodiment in which the rib 124f is coextruded from the base 102, such that the rib is substantially rigid.

Figure 18:
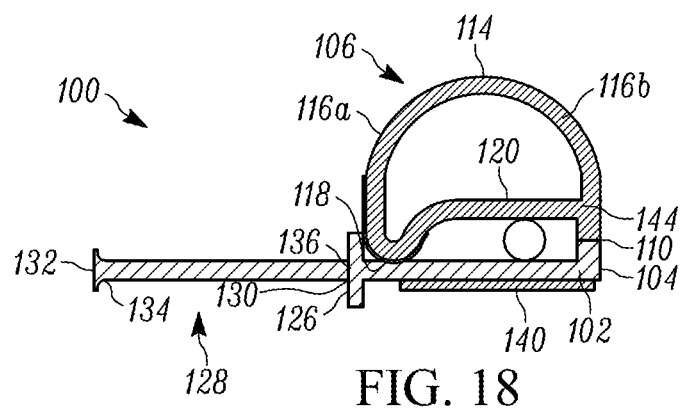
FIG. 18 depicts an alternative embodiment of the seal of FIG. 1, wherein the rib is omitted and an extension is located proximate the protrusion.

FIG. 18 depicts an alternative embodiment in which the rib 124, 124a-124f is omitted. In such embodiment, the seal is formed from contact between the protrusion 118 and the base 102 and/or extension 136.

Preferred Embodiment

Figure 19:
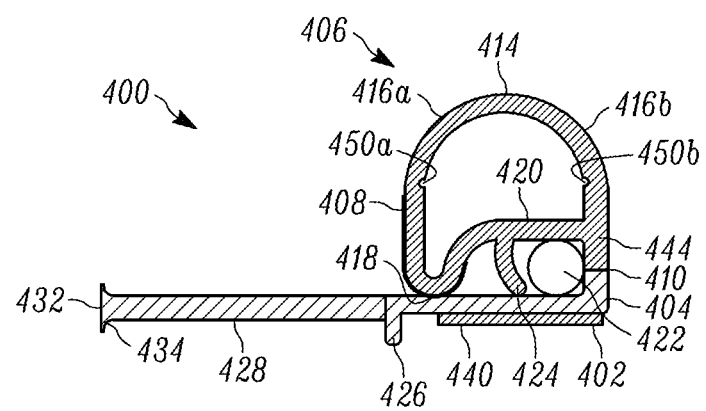
FIG. 19 depicts a preferred embodiment of a seal, wherein the rib extends from the bulb towards the base.

FIG. 19 depicts a preferred embodiment of the seal 400 in accordance with the present disclosure. Except as otherwise noted herein, like reference numbers (e.g. the bulb, elements 106 and 406) are used to identify like components. The seal 400 of the preferred embodiment of FIG. 19 is similar to the first embodiments unless otherwise noted.

This seal 400 includes a base 402, a first offsetting member 404, a bulb 406, and wiper 428. The offsetting member 404 extends perpendicularly "upwards" from the base 202 toward the bulb 406.

In the embodiment shown, the bulb 406 is integrally joined to the first offsetting member 404 at bulb hinge 410. Sidewall 416b and inner wall 420 meet proximate the hinge 410. The bulb 406 has an outer arcuate portion 414 that is joined to opposing sidewall 416a, 416b. Sidewall 416a extends toward the base 402, with protrusion 418 extending below inner wall 420 and contacting the base 402 when the bulb 406 is in a lowered position. The inner wall 420 is parallel to the base 402.

In the embodiment shown, a slip coat 408 extends around a portion of the sidewall 416a and protrusion 418. As will be clear to one of skill in the art, further alternative embodiments may omit the slip coat 408.

A rib 424 is attached to the bulb 406 and extends from the inner wall 420 towards the base 402. A passageway 422 is formed and bounded by the base 402, first offsetting member 404, a bulb hinge 410, second offsetting member 444, inner wall 420, and rib 424. The passageway is sized and adapted to securely contain cabling therewithin.

In the embodiment shown, the rib 424 is formed of a resilient material and is sized such that with the bulb 406 in its lower position, the rib 424 is pressed against the base 402 and resiliently deformed, thereby creating a seal therebetween and impeding access to the passageway 422. The extension of the rib 424 from the inner wall 420 allows for the storage of various sized gauge wires within the passageway 422.

The embodiment of FIG. 19 may further comprise a wiper 428 extending co-linearly from the base 402 and integrally joined to the base 402 at a first end. A second, distal end 432 is cantilevered with respect to the first end. Distal end 432 may further comprise a flared tip 434.

It is contemplated that the wiper has lateral sides that are substantially parallel or, in the alternative, not parallel, if a non-uniform cross section is desired. For instance, a taper narrowing from the first end toward the distal end 432 may be used.

The embodiment of FIG. 19 may further comprise a locating leg 426 joined to the base 402 and extending perpendicularly "downwards" away from the base 402 and bulb 406. In the embodiment depicted in FIG. 19, the locating leg 426 is joined with the base 402 at the same location as the first end of the wiper 428 joins the base 402. In the embodiment depicted, the entire bulb 406 is between the outermost portion of the offsetting member 404 and the surface of the locating leg 426 facing the offsetting member 404. Other embodiments for different positions of the locating leg are contemplated.

In the embodiment shown, the base 402 is comprised of a higher durometer material than the rest of the seal 400. In an embodiment, the locating leg 426 is made from the same durometer material as the base 402.

In the embodiment shown, the bulb 406 is made of a material that is a lower durometer than the base 402. The use of the same wall thickness in the protrusion 418, sidewalls 416, and inner wall 420 allows the entire bulb 406 to be readily deformable when pressed against the base 402. The embodiment of FIG. 19 further comprises a first divot 450a and a second divot 450b along the interior surface of the bulb 406. The first divot 450a is proximate the first sidewall 416a and second divot 450b is proximate the second sidewall 416b. The divots 450 guide the deformation of the bulb 406, when the bulb 406 is pressed against the base.

The seal may be coextruded so that the transitions between materials are integrally joined.

With the bulb 406 in the first (lower) position, the bulb 406 encloses and generally covers the base 402 and the passageway 422. The resiliency of the offsetting member 404 and/or the hinge 410 bias the cantilevered bulb 406 into the lower position depicted in FIG. 19.

The first offsetting member 404 and/or hinge 410 provide predictable bending that allows the bulb portion 406 to be bent into a second (raised) position. Having hinge 410 be of a softer durometer yield provides a bendable hinge while the first offsetting member 404 does not move. While the bulb 406 is in its raised position, the rib 424 reverts to its uncompressed, "upright" position and the passageway 422 is accessible.

In the first, lower position, the rib 424 prevents water or other contaminants from accessing the passageway 422. For example, water flowing along a wiper 428 may traverse the space between protrusion 418 and the base 402. However, water is unable to continue flowing past the rib 424 due to compression between the rib 424 and base 402.

Similar to embodiments described in FIGS. 1-18, the seal 400 may be installed by using adhesive tape 440 to secure the seal 400 in place.

Alternate embodiments of the seal depicted in FIG. 19 may combine the bulb 406 of FIG. 19 with the base 102, 202, leg 126, 226, and/or wiper 128, 228 of FIGS. 1-18.

The foregoing examples have been provided merely for the purpose of explanation, and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

Any other undisclosed or incidental details of the construction or composition of the various elements of the disclosed embodiment of the present invention are not believed to be critical to the achievement of the advantages of the present invention, so long as the elements possess the attributes needed for them to perform as disclosed. Certainly, one skilled in the field would be able to conceive of a wide variety of alternative configurations and successful combinations thereof. The selection of these and other details of construction are believed to be well within the ability of one of even rudimental skills in this area, in view of the present disclosure. Illustrative embodiments of the present invention have been described in considerable detail for the purpose of disclosing a practical, operative structure whereby the invention may be practiced advantageously. The designs described herein are intended to be exemplary only. The novel characteristics of the invention may be incorporated in other structural forms without departing from the spirit and scope of the invention. The invention encompasses embodiments both comprising and consisting of the elements described with reference to the illustrative embodiments. All technical terms shall take on their customary meaning as established by the appropriate technical discipline utilized by those normally skilled in that particular art area.

What is claimed is:

1. A seal for a siding of a wall, the seal comprising:
a base;
an offsetting member extending substantially perpendicularly from the base, wherein a first end of the offsetting member is connected to the base;
a bulb comprising a proximal side opposing a distal side, the bulb connected to a second end of the offsetting member; and
a rib disposed between the base and the bulb and between the offsetting member and distal side of the bulb, wherein the rib is in contact with the base and the bulb when the bulb is in a first position.

2. The seal as claimed in claim 1, wherein the rib is integrally formed with the base.

3. The seal as claimed in claim 1, wherein the rib is integrally formed with the bulb.

4. The seal as claimed in claim 1, wherein the bulb is hingedly connected to the offsetting member at the proximal side such that the bulb is movable between a first position wherein the distal side of the bulb is proximate the base and a second position wherein the distal side of the bulb is spaced apart from the base.

5. The seal as claimed in claim 1, wherein the bulb further comprises a protrusion extending towards the base.

6. The seal as claimed in claim 5, wherein the protrusion is located on a distal side of the rib.

7. The seal as claimed in claim 5, wherein the seal is coextruded.

8. The seal as claimed in claim 5, wherein the protrusion contacts the base when the bulb is in the first position.

9. The seal as claimed in claim 1 further comprising an extension, wherein the extension extends from towards the bulb from the base and is located to a distal side of the rib.

10. The seal as claimed in claim 9, wherein a leg extends from the base opposite the extension.

11. The seal as claimed in claim 1, wherein the bulb is made from a material with a durometer lower than that of said base, said bulb being movable by a bulb hinge between a first position in which an inner wall of the bulb is substantially parallel to and spaced from said base, and a second position in which said bulb is bent away from said base so that said inner wall is spaced farther from said base than in said first position.

12. The seal as claimed in claim 11 wherein said bulb hinge is composed of a material having a lower durometer than said base.

13. The seal as claimed in claim 1, wherein the bulb includes a first divot located proximate the interior of a first sidewall and a second divot located proximate the interior of a second sidewall.

14. The seal as claimed in claim 1 further comprising a wiper extending substantially co-linearly from said base, said wiper having a proximal end integrally joined to said base and a distal end opposite said proximal end.

15. The seal as claimed in claim 14, wherein said wiper includes a flared tip at said distal end being wider than a portion of said first wiper adjacent to said flared tip.

16. The seal as claimed in claim 15, wherein said flared tip includes a coating having a higher durometer than said wiper.

17. The seal as claimed in claim 16, wherein said coating is also applied to a portion of said bulb.

18. The seal as claimed in claim 17, wherein said coating is approximately 0.002-0.010 inches thick.

19. A seal for a siding of a wall, the seal comprising:
a base;
a first offsetting member extending substantially perpendicularly from the base, wherein a first end of the first offsetting member is connected to the base;
a hinge connecting the first offsetting member to a second offsetting member a bulb connected to the second offsetting member, the bulb comprising:
a first sidewall,
a second sidewall opposing the first sidewall,
a pair of divots proximate each of the first and second sidewalls,
an arcuate portion connecting the first and second sidewalls,
a protruding portion connected to the first sidewall, wherein the protruding portion is in contact with the base when the bulb is in a first position,
an inner wall, parallel to the base and connecting to the protruding portion at one end and connecting to the second sidewall and second offsetting member at a second end, and
a rib extending from the inner wall of the bulb to the base, wherein the rib is in contact with the base when the bulb is in a first position and forms a passageway with the base, first offsetting member, second offsetting member, hinge, and inner wall.

20. The seal as claimed in claim 19, wherein the bulb is made from a material with a durometer lower than that of said base, said bulb being movable by a bulb hinge between a first position in which an inner wall of the bulb is substantially parallel to and spaced from said base, and a second position in which said bulb is bent away from said base so that said inner wall is spaced farther from said base than in said first position.

21. The seal as claimed in claim 5, the bulb further comprising an inner wall, parallel to the base and connecting to the protruding portion at one end and connecting to the proximal side of the bulb at a second end,
wherein the rib contacts the protrusion and does not contact the inner wall when the bulb is in the first position.

22. The seal as claimed in claim 5, the bulb further comprising an inner wall, parallel to the base and connecting to the protruding portion at one end and connecting to the proximal side of the bulb at a second end,
wherein the rib contacts the protrusion and the inner wall when the bulb is in the first position.

23. The seal as claimed in claim 5, the bulb further comprising an inner wall, parallel to the base and connecting to the protruding portion at one end and connecting to the proximal side of the bulb at a second end,
wherein the rib contacts the inner wall and does not contact the protrusion when the bulb is in the first position.

* * * * *